United States Patent [19]

Tsai et al.

[11] Patent Number: 5,587,878
[45] Date of Patent: Dec. 24, 1996

[54] ANTI-THEFT MECHANISM IN A COMPUTER SYSTEM HAVING REMOVABLE MODULES

[75] Inventors: Philip Tsai, Taipei; Chun-Yen Hung, Chung-Ho; Fen-Shiung Wu, Taipei, all of Taiwan

[73] Assignee: Acer Incorporated, Taipei, Taiwan

[21] Appl. No.: 388,691

[22] Filed: Feb. 15, 1995

[51] Int. Cl.⁶ .................................................. G06F 1/16
[52] U.S. Cl. .................... 361/683; 361/726; 361/732; 361/747
[58] Field of Search ...................... 361/680, 683, 361/684, 685, 686, 724–727, 732, 740, 747, 759; 312/215, 222, 223.2; 364/708.1; G06F 1/16

[56] References Cited

U.S. PATENT DOCUMENTS 5,278,730  1/1994  Kikinis .................... 361/686
5,383,098  1/1995  Ma et al. .................. 361/818
5,430,617  7/1995  Hsu ........................ 361/818

*Primary Examiner*—Leo P. Picard
*Assistant Examiner*—Lynn D. Hendrickson
*Attorney, Agent, or Firm*—Townsend and Townsend and Crew LLP

[57] ABSTRACT

An anti-theft mechanism for use in a portable computer system mechanism protects a removable component from being easily stolen. The anti-theft mechanism comprises an opening on a lower case of the portable computer system; a through-hole in the portable component; and a securing element for inserting into the through-hole. The securing element allows movement of the portable component when in a first position, and prevents movement of the portable component when in a second position.

9 Claims, 2 Drawing Sheets

ANTI-THEFT MECHANISM IN A COMPUTER SYSTEM HAVING REMOVABLE MODULES

BACKGROUND OF THE INVENTION

The present invention relates generally to computer systems having portable (removable) components, and more particularly to computer systems incorporating anti-theft mechanisms on their portable components.

As computers, especially portable computers, are increasingly modularized, modular components such as portable hard disk drives, portable floppy drives, battery packs, and portable CD-ROM players are more commonly installed. For the user's convenience, these component modules are designed to be easily separable from and installable into the computer. Unfortunately, this makes them easy to steal. Such theft represents a significant financial loss, but more important is the fact that some of these components, for example, a portable hard disk drive, contain proprietary or confidential information. Corporate secrets thus could be accessed by competitors once the portable hard disk drive is stolen.

FIG. 3 shows a prior art anti-theft mechanism in a portable (notebook) computer. The computer is shown without its hinged upper portion containing the display. A portable hard disk module H is mounted in a housing F, shown disassembled with the keyboard removed. To prevent the portable hard disk H from being easily stolen, an h-shaped device L can be inserted into a slot S. Slot S is designed specifically on the side of portable hard disk H for allowing insertion of the h-shaped device L so that the h-shaped device sits on the edge of the side. Button B can be pressed to release a latch which is used to lock portable hard disk H. When h-shaped device L is inserted, its horizontally protruding portion T prohibits any movement of the latch so that hard disk H is secured in computer housing F and can not be drawn out of the computer system body.

While the above-described prior art mechanism prevents portable modules from being easily stolen, the setup procedure is so tedious that few users would bother to activate this function. First, access to allow insertion of the h-shaped devices requires disassembly of the lower portion of the computer, typically requiring the removal of a number of screws. After this disassembly, the user has to precisely insert the h-shaped device into the expected position to lock the latch. The disassembling and assembling are not simple processes and require special mechanical proficiency. As a result, users have trouble setting up the anti-theft mechanism and can damage the computer system. Furthermore, the h-shaped device has to be particularly stored in some place when the anti-theft function is not to be activated. Because of the size of the h-shaped device, it is very possible that the h-shaped device can not be found or reached when a user desires to use the anti-theft function.

SUMMARY OF THE INVENTION

The present invention provides a simple, user-friendly, and cost-effective anti-theft mechanism that prevents thieves from easily stealing portable components from a computer system.

In brief, the anti-theft mechanism according to the present invention provides an element that is movable between a first (unlocked) position which does not impede removal of the module and a second (locked) position which prevents such removal. The element is readily accessible for movement from the unlocked position to the locked position, but less readily accessible for movement from the locked to the unlocked position.

In a specific embodiment, the element is a pin that fits within a through-hole in the module. In the unlocked position, the pin allows the module to be inserted into and withdrawn from the module slot. In the locked position the pin protrudes from the module sufficiently to engage a portion of the surrounding structure of the computer so as to prevent the module from being withdrawn. The portion of the structure that is engaged by the pin is not visible or accessible without some disassembly of the computer. On the other hand, an accessible opening is provided to allow the user to push the pin from the unlocked position to the locked position.

In a specific embodiment, the pin is formed with a protrusion, which selectively engages one of a pair of indentations formed inside the through-hole to define detents at the unlocked and locked positions. Further, in a specific embodiment, the pin does not protrude from the module in the unlocked position.

A further understanding of the nature and advantages of the present invention can be realized by reference to the remaining portions of the specification and drawings.

DESCRIPTION OF THE PREFERRED EMBODIMENT

Figure 1A:
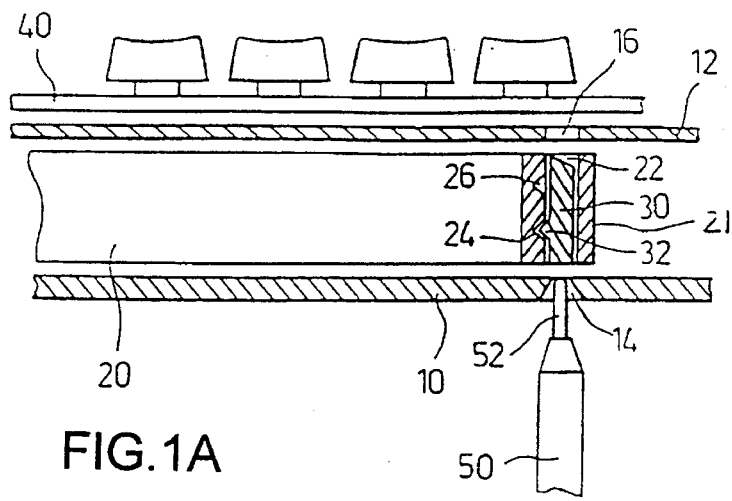
FIGS. 1A and 1B are cross-sectional views of the present invention when activating the anti-theft mechanism.
Figure 1B:
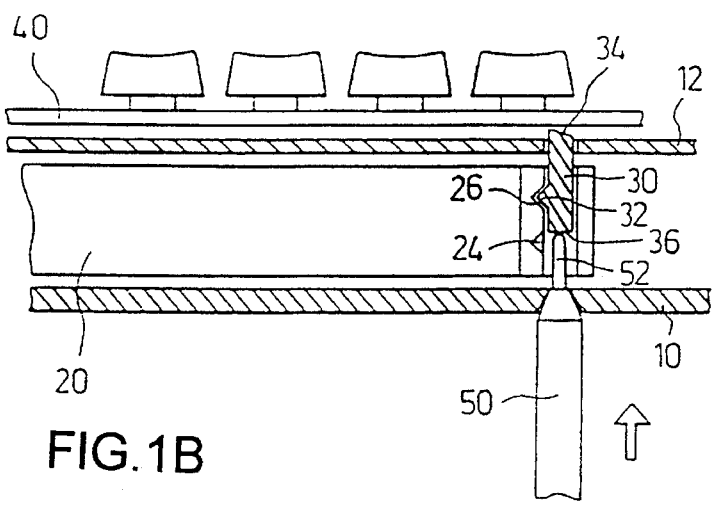
Figure 1C:
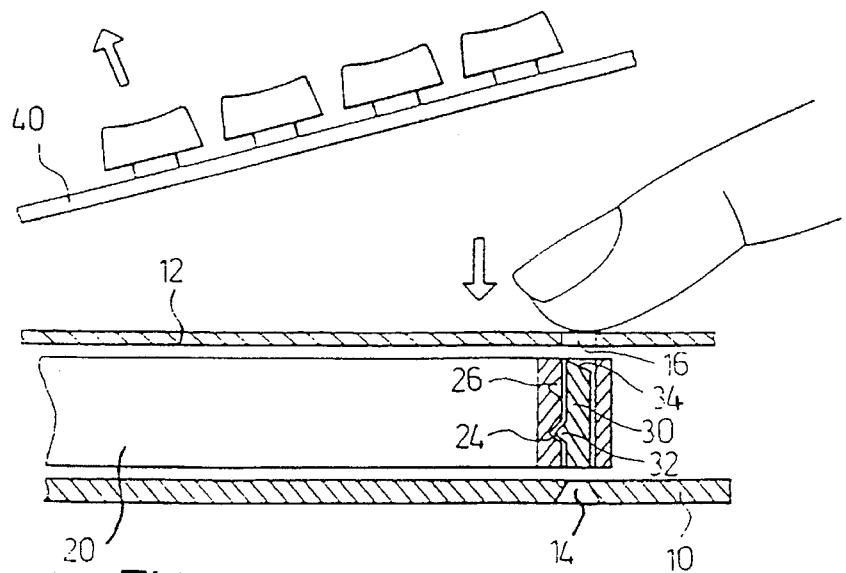
FIGS. 1C is a cross-sectional view of the present invention when releasing the anti-theft mechanism.
Figure 2:
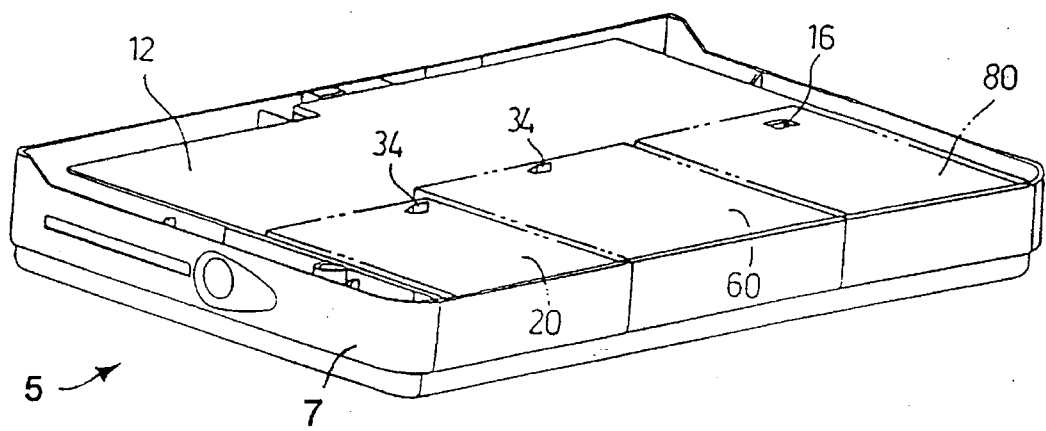
FIG. 2 is a perspective view of the lower portion of a notebook computer incorporating the anti-theft mechanism according to the present invention.
Figure 3:
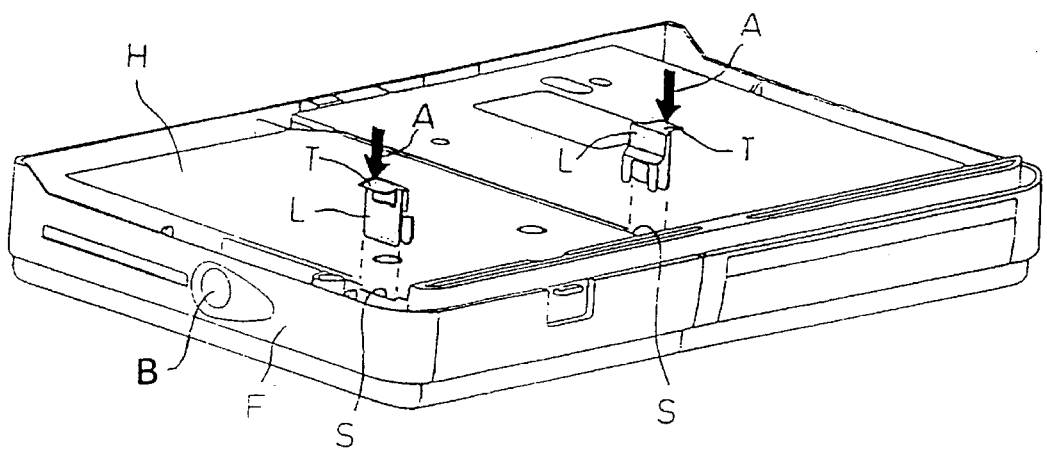
FIG. 3 a perspective view of the lower portion of a notebook computer having a prior art anti-theft mechanism.

FIGS. 1A–1C are cross-sectional views and FIG. 2 is a perspective view of the normally lower portion 5 of a portable (notebook) computer system, referred to as the computer, incorporating the anti-theft mechanism of the present invention. The anti-theft mechanism prevents the removal of removable modular components. As such, it would have applicability to those desktop computer systems that have removable modular components. The discussion will, however, concentrate on a specific embodiment implemented in a portable computer as shown.

As is well known, this type of portable computer also includes a hinged normally upper portion (not shown), which includes a display. For purposes of the description that follows, the lower portion of the computer will be considered to extend in a horizontal plane, and references to direction will be in view of this assumed orientation.

As can be seen in the figures, the lower portion includes a case 7 in which are located a number (three in the specific embodiment) of compartments, referred to as slots, which accommodate removable modules 20, 60, and 80. The sectional views show a portion of module 20, which may be a hard disk module.

Case 7 includes a bottom 10, while an upper plate 12 is disposed over the modules. The modular construction of the computer is such that the modules can be removed by sliding them out of the case. A keyboard unit 40 is located above upper plate 12. Upper plate 12 is preferably made of conducting material, for example aluminum, which helps to fulfill EMI grounding requirements.

Module 20 is first placed in a frame 21 and then installed in the space between upper plate 12 and bottom 10. Frame 21 is formed with a vertical through-hole 22, which is aligned with an opening 16 on upper plate 12 and an opening 14 on bottom 10. A securing element 30, preferably a vertically extending elongate member such as a pin as shown in FIG. 1A, can be easily inserted into through-hole 22 by a user before inserting the module into the computer. A detent mechanism is provided to hold the securing device in either of a first unlocked position or a second locked position. To this end, securing element 30 comprises a horizontally protruding portion 32, and the inner surface of through-hole 22 is formed with a lower recess 24 and an upper recess 26.

As can be observed from FIGS. 1A and 1B, securing element 30 can be held at one of two positions when inserted into through-hole 22. Protruding portion 32 may be locked in recess 24 or recess 26, depending on the mode the user desires. The length of the securing element is designed that it would be hidden when protruding portion 32 engages recess 24 (unlocked position, FIG. 1A), and sticking through opening 16 of the upper plate when protruding portion 32 engages recess 26 (locked position, FIG. 1B). Securing element 30 and the wall of through-hole 22 are preferably made of flexible material, e.g. plastic, so that securing element 30 moves smoothly within the through-hole 22 from one position to another. When securing element 30 is in the unlocked position, it does not engage upper plate 12, and the hard disk unit can be freely drawn out of the computer system body. When securing element 30 is in the locked position, an upper portion 34 of securing element enters opening 16, thereby engaging the upper plate and preventing withdrawal of hard disk module 20. FIG. 2 shows modules 20 and 60 in the locked configuration and module 80 in the unlocked configuration.

Securing element 30 can be pre-installed in through-hole 22 and held in the unlocked position. The user may choose not to activate the anti-theft function and let the securing element stay in position. Otherwise, if the user wishes to activate the anti-theft function, the user can insert a tool with a thin and long portion, such as the front part 52 of a pen 50, through opening 14 to push securing element 30 upward to the locked position. The hard disk module 20 is then locked in the computer system. Opening 14 is in general commensurate with or smaller than the cross section of the pin. If desired, a small sliding door could cover the opening.

While it is simple to engage the locking mechanism, releasing it requires enough effort to discourage theft. To release the module 20 when it is locked, a user first opens and lifts up keyboard unit 40 to access opening 16. As shown in FIG. 1C, keyboard unit 40 is preferably removable through unlocking latches (not shown), as in an AcerNote 900 notebook computer manufactured by Acer Incorporated. The user then pushes securing element 30 downward from the locked position to the unlocked position, causing securing element 30 to withdraw from engagement with the upper plate and thus deactivate the anti-theft function.

A user does not have to do any disassembly to lock a module. The user need only pick up a pen and stick it through opening 14 into through-hole 22. The whole procedure takes less than 10 seconds, as opposed to more than 3 minutes for a prior art computer system where disassembly is necessary to install separate locking elements. In addition, the securing element is kept in the through-hole whether the anti-theft function is activated or not. Hence the securing element need not be removed from the computer, possibly to be lost or forgotten. This saves much trouble on the user's part, for the user will not be required to keep track of the securing element 30. Furthermore, the anti-theft mechanism of the present invention is simple and low-cost but effective. Individuals other than the common users of a computer incorporating the present invention will not be able to figure out quickly the way to deactivate the mechanism. The present invention can therefore achieve a useful level of anti-theft function.

Conclusion

In conclusion it can be seen that the present invention provides a simple and elegant technique for providing security for removable components in a computer system. The invention adds negligible cost to manufacturing, but produces a significant degree of protection. In addition, the invention is convenient for users to activate.

While the above is a complete description of a preferred embodiment of the invention, various modifications, alternative constructions, and equivalents may be used. For example, while the securing device is shown as having a rectangular cross-section with the protrusion extending from one edge, there are other possibilities, such as a cylindrical pin with a circumferentially extending ridge.

Additionally, while upper portion 34 of securing element 30 is shown as engaging opening 16 in upper plate 12, the similar benefits would be obtained if the securing element engaged a suitably disposed edge of the upper plate.

Furthermore, while the securing element in the specific embodiment is a reciprocating pin, which lends itself to a particularly simple construction, a rotating element could be used.

Moreover, while opening 14 for locking the module and opening 16 for unlocking the module are formed in case bottom 10 and upper plate 12, which are parallel and bound the module slot from above and below, there are other geometries. One example would be to have the securing element accessed from the side. This might be especially suitable where the securing element rotates into engagement with the slot's surrounding structure.

Therefore, the above description and illustration should not be taken as limiting the scope of the invention which is defined by the claims.

What is claimed is:

1. A module for sliding insertion along a first axis into a slot on a computer, the module comprising:

a portion formed with a through-hole extending along a second axis perpendicular to the first axis;

an elongate element movable along said second axis in said through-hole between a first position where said element is confined within said module and a second position where said element protrudes outside said module; and a detent mechanism for maintaining said element in either of said first and second positions.

2. The module of claim 1 wherein said detent mechanism is defined by first and second recesses formed in an inner wall of said through hole and a protrusion formed on said element.

3. A modular computer system comprising:

a computer body having at least one slot for accommodating a module, said body having at least one accessible opening;

a module sized to be inserted into said slot by movement along a first axis; and an element mounted to said module, said element being movable from a first position in which said module may be inserted into and withdrawn from said slot and a second position where said element engages a normally invisible portion of said body so as to prevent removal of said module from said slot;

said opening being located relative to said element when said module is in said slot to allow access to said element for moving said element from said first position to said second position, but not for moving said element from said second position to said first position;

said element being accessible for movement from said second position to said first position only after at least partial removal of at least one portion of said body.

4. The modular computer system of claim 3 wherein said element is a pin that is movable along a second axis perpendicular to said first axis.

5. The modular computer system of claim 3, and further comprising a detent mechanism for maintaining said element in either of said first and second positions.

6. The modular computer system of claim 3 wherein said element engages said normally invisible portion of said body by passing through an opening formed in said normally invisible portion of said body.

7. A modular computer system comprising:

a computer body having at least one slot for accommodating a module, said slot being bounded by a normally accessible first surface and a less-accessible second surface;

said first and second surfaces being formed with respective first and second openings;

a module sized to be inserted into said slot by movement along a first axis; and an element mounted to said module, said element being movable from a first position in which said module may be inserted into and withdrawn from said slot and a second position where said element engages said second opening so as to prevent removal of said module from said slot;

said first opening being located relative to said element when said module is in said slot to allow access to said element for moving said element from said first position to said second position, but not for moving said element from said second position to said first position;

said second opening, when accessed, allowing movement of said element from said second position to said first position.

8. An anti-theft mechanism for use in a computer system, comprising:

a lower portion of the computer system for accommodating a portable component, said lower portion formed with a first opening;

a portable component installed in the computer system, the portable component having a through-hole; and a securing element located in the through-hole and for being held at one of a first position and a second position in the computer system, the portable component being removable when the securing element is in the first position, and the securing element preventing removal of the portable component when the securing element is in the second position, the securing element being accessible through said first opening for movement from said first position to said second position, but not for movement from said second position to said first position.

9. The anti-theft mechanism of claim 1 wherein the securing element engages a second opening on an upper plate of the lower portion when the securing element is held at the second position.

\* \* \* \* \*